(12) United States Patent
Froloff

(10) Patent No.: US 7,434,176 B1
(45) Date of Patent: *Oct. 7, 2008

(54) SYSTEM AND METHOD FOR ENCODING DECODING PARSING AND TRANSLATING EMOTIVE CONTENT IN ELECTRONIC COMMUNICATION

(76) Inventor: Walt Froloff, 273D Searidge Rd., Aptos, CA (US) 95003

( * ) Notice: Subject to any disclaimer, the term of this patent is extended or adjusted under 35 U.S.C. 154(b) by 0 days.

This patent is subject to a terminal disclaimer.

(21) Appl. No.: 10/648,433

(22) Filed: Aug. 25, 2003

(51) Int. Cl.
*G06F 15/00* (2006.01)
*G06F 13/00* (2006.01)

(52) U.S. Cl. ...................... 715/839; 715/763

(58) Field of Classification Search .............. 715/853, 715/854, 751, 769, 762–765, 744, 708, 781, 715/839, 855
See application file for complete search history.

(56) References Cited

U.S. PATENT DOCUMENTS

| | | | | |
|---|---|---|---|---|
| 5,732,232 A | * | 3/1998 | Brush et al. ................. | 715/751 |
| 6,522,333 B1 | * | 2/2003 | Hatlelid et al. .............. | 345/474 |
| 6,784,900 B1 | * | 8/2004 | Dobronsky et al. ......... | 715/744 |

OTHER PUBLICATIONS

Live Journal.com in 1999.*
SapmBlockerUtility.com CopyRight @1999-2005 1-3 pages.*
Caroline Henton, "Generating and Manipulating Emotional Synthetic Speech on a Personal Computer", p. 108, Multimedia Took and Applications 3, 105-125 (1996), © 1996 Huwer Academic Publications Manufactured in the Netherlands.

* cited by examiner

*Primary Examiner*—Kevin Nguyen
(74) *Attorney, Agent, or Firm*—Walt Froloff

(57) ABSTRACT

A method of providing precise emotive content in electronic communications. Methods include encoding emotive content comprised of emotive vectors and associated text into electronic communication which is transmitted to receiver computer devices, decoded and parsed to provide emotive content for processing and display. Display includes representing emotive vectors by face glyphs from a graphical set of face glyphs whose character representations are embedded in communications and processed to disambiguate text into intended meaning.

18 Claims, 9 Drawing Sheets

| Dec | Hex Code | Graphic Name | Label | Char |
|---|---|---|---|---|
| 0- | 0001 x000 | Emotive Glyph Aggressive | ES1 | |
| 1- | 0001 x001 | Emotive Glyph Agonized | ES2 | |
| 2- | 0001 x002 | Emotive Glyph Angry | ES3 | |
| 3- | 0001 x003 | Emotive Glyph Annoyed | ES4 | |
| 4- | 0001 x004 | Emotive Glyph Anxious | ES5 | |
| 5- | 0001 x005 | Emotive Glyph Apologetic | ES6 | |
| 6- | 0001 x006 | Emotive Glyph Aroused | ES7 | |
| 7- | 0001 x007 | Emotive Glyph Arrogant | ES8 | |
| 8- | 0001 x008 | Emotive Glyph Bashful | ES9 | |
| 9- | 0001 x009 | Emotive Glyph Blissful | ES10 | |
| 10- | 0001 x00A | Emotive Glyph Bored | ES11 | |
| 11- | 0001 x00B | Emotive Glyph Cautious | ES12 | |
| 12- | 0001 x00C | Emotive Glyph Concentrating | ES13 | |
| 13- | 0001 x00D | Emotive Glyph Confident | ES14 | |
| 14- | 0001 x00E | Emotive Glyph Curious | ES15 | |
| 15- | 0001 x00F | Emotive Glyph Demure | ES16 | |
| 16- | 0001 x010 | Emotive Glyph Determined | ES17 | |
| 17- | 0001 x011 | Emotive Glyph Disappointed | ES18 | |
| 18 | 0001 x012 | Emotive Glyph Disapproving | ES19 | |
| 19- | 0001 x013 | Emotive Glyph Disbelieving | ES20 | |
| 20- | 0001 x014 | Emotive Glyph Disgusted | ES21 | |
| 22- | 0001 x015 | Emotive Glyph Distasteful | ES22 | |
| 23- | 0001 x016 | Emotive Glyph Ecstatic | ES23 | |
| 24- | 0001 x017 | Emotive Glyph Enraged | ES24 | |
| 25- | 0001 x018 | Emotive Glyph Envious | ES25 | |
| 26- | 0001 x019 | Emotive Glyph Exasperated | ES26 | |
| 27- | 0001 x01A | Emotive Glyph Exhausted | ES27 | |
| 28- | 0001 x01B | Emotive Glyph Frightened | ES28 | |
| 29- | 0001 x01C | Emotive Glyph Frustrated | ES29 | |
| 30- | 0001 x01D | Emotive Glyph Grieving | ES30 | |
| 31- | 0001 x01E | Emotive Glyph Guilty | ES31 | |
| 31- | 0001 x01F | Emotive Glyph Happy | ES32 | |
| 32- | 0001 x020 | Emotive Glyph Horrified | ES33 | |
| 33- | 0001 x021 | Emotive Glyph Hurt | ES34 | |

FIG. 3A

| | | | | | | |
|---|---|---|---|---|---|---|
| 34- | 0001 | x022 | Emotive Glyph | Hysterical | ES35 |  |
| 35- | 0001 | x023 | Emotive Glyph | Idiotic | ES36 |  |
| 36- | 0001 | x024 | Emotive Glyph | Indifferent | ES37 |  |
| 37- | 0001 | x025 | Emotive Glyph | Innocent | ES38 |  |
| 38- | 0001 | x026 | Emotive Glyph | Interested | ES39 |  |
| 39- | 0001 | x027 | Emotive Glyph | Irate | ES40 |  |
| 40- | 0001 | x028 | Emotive Glyph | Jealous | ES41 |  |
| 41- | 0001 | x029 | Emotive Glyph | Lonely | ES42 |  |
| 42- | 0001 | x02A | Emotive Glyph | Meditative | ES43 |  |
| 43- | 0001 | x02B | Emotive Glyph | Mischievous | ES44 |  |
| 44- | 0001 | x02C | Emotive Glyph | Miserable | ES45 |  |
| 45- | 0001 | x02D | Emotive Glyph | Negative | ES46 |  |
| 46- | 0001 | x02E | Emotive Glyph | Obstinate | ES47 |  |
| 47- | 0001 | x02F | Emotive Glyph | Optimistic | ES48 |  |
| 48- | 0001 | x030 | Emotive Glyph | Pained | ES49 |  |
| 49- | 0001 | x031 | Emotive Glyph | Paranoid | ES50 |  |
| 50- | 0001 | x032 | Emotive Glyph | Perplexed | ES51 |  |
| 51- | 0001 | x033 | Emotive Glyph | Prudish | ES52 |  |
| 52- | 0001 | x034 | Emotive Glyph | Puzzled | ES53 |  |
| 53- | 0001 | x035 | Emotive Glyph | Regretful | ES54 |  |
| 54- | 0001 | x036 | Emotive Glyph | Relieved | ES55 |  |
| 55- | 0001 | x037 | Emotive Glyph | Sad | ES56 |  |
| 56- | 0001 | x038 | Emotive Glyph | Satisfied | ES57 |  |
| 57- | 0001 | x039 | Emotive Glyph | Shocked | ES58 |  |
| 58- | 0001 | x03A | Emotive Glyph | Smug | ES59 |  |
| 59- | 0001 | x03B | Emotive Glyph | Surly | ES60 |  |
| 60- | 0001 | x03C | Emotive Glyph | Surprised | ES61 |  |
| 61- | 0001 | x03D | Emotive Glyph | Suspicious | ES62 |  |
| 62- | 0001 | x03E | Emotive Glyph | Sympathetic | ES63 |  |
| 63- | 0001 | x03F | Emotive Glyph | Thoughtful | ES64 |  |
| 64- | 0001 | x040 | Emotive Glyph | Undecided | ES65 |  |
| 65- | 0001 | x041 | Emotive Glyph | Withdrawn | ES66 |  |

FIG. 3B

SYSTEM AND METHOD FOR ENCODING DECODING PARSING AND TRANSLATING EMOTIVE CONTENT IN ELECTRONIC COMMUNICATION

RELATED APPLICATION

This application references a previous filed application in a related field of invention; Ser. No. 09/563,624 filed May 2, 2000, entitled "System and Method for the Embedment of Emotive Content Into Modern Text Processing, Publishing and Communication." patent application Ser. No. 10/445,758 filed May 27, 2003, entitled "System and Method For Creating Custom Specific Text and Emotive Content Response Templates For Textual Communications" is also related with this application.

BACKGROUND OF THE INVENTION

1. Field of the Invention

The present invention relates to the field of emotive content in electronic communication. More particularly, the present invention relates to methods of embedding and encoding emotive content into files and data-streams for transmission, decoding and parsing of these files and data-streams containing emotive content in communications.

2. Background

Emotions and computers have, almost from the inception of these devices, been diametrically opposed concepts. Where computers calculate, humans reason. Reasoning has the emotive component that has heretofore evaded computer models and theories. Feelings are separate and different from thinking and vice versa. The intellect has little room for irrational thought. Emotions and are tolerated as a human shortfall in an intellectuals character. Even in areas such as law, the legal mind is taught to avoid inflaming the passions of the jury. The teaching is to use cold logic in deducing, deriving and proving legal conclusions. In science, there is little room for emotion, as they tend to be unique in situation and circumstance. Emotions are not repeatable as scientific testing requires and elusive in most practical respects. For these and other reasons, computer programs, communication and software applications have tended to ignore emotions, not the least of which is that they are fleeting and too difficult to capture with any fidelity in an electronic format. We are emotional social creatures and we are known to use emotive capabilities at times unconsciously or subtly, but in many surprisingly useful and in powerful ways.

Transmission of feelings has heretofore been left mostly to the arts. However, textual communication has begun to find small niches to allow transmission of feelings. Emocons and smiley face graphic sets have emerged but these are still very primitive in allowing any precision in emotive transmission and certainly nothing practical in information processing technology. What are needed are techniques and mechanisms to facilitate the transmission and processing of emotive content. Content which would facilitate a richer communication alphabet and grammar as well as electronic tools for processing the emotive and cognitive content in electronic communications.

Embedded Emotive Content

Emocon type face glyphs are emerging in some communications as an attempt to add something to the drab text that generally carries the communication to readers. Current face glyphs are a small step up from emocons, facial expressions using ASCII code characters. With graphical output options currently available on computers and computing devices, facial glyph expressions have evolved from ASCII display character :-) faces onto face glyphs smiley faces. This trend to display graphical output on computer device screens and video is growing. Picture messaging and content delivery services are now available to mobile data computing devices. Companies are expanding support for all popular message devices and a variety of graphics-capable handheld and messaging computer devices. Although the hardware capabilities have enabled graphical face glyphs, these capabilities have not been used to expand capabilities in basic communication. The new graphics-capable devices do not have comparable new and better ways of communication that can take advantage of the enhanced technology. There is a need to increase the quality of basic textual communication. Textual communication has been in existence for a long time despite the advances in transmission and display technologies, there has been little advancement in functionality of textual communication above what has been known. What is needed are ways of increasing the precision and enriching textual communication without adding the burden of larger working vocabularies upon users.

Textual communication by its nature can be ambiguous or obscure because of the multiple meanings in language. Emotive content from gestures, facial expressions, body language, and such have been used in conjunction with words to transmit meaning in language. Emotions are mostly absent with modern communication relying on text to carry the message. However, emotive content is used to focus the text and words onto the intended meaning out of a number of possible alternative inferences. Methods for embedding emotive content by a sender have been developed (see U.S. patent application '624). These methods can be used to add emotive content by both graphical and textual mean. When emotive content is purely textual, understanding is further complicated for reasons such as imprecision in emotive intensity or ambiguity for lack of a more complete description of the emotive state. If emotive content is presented graphically, complexity is increased because the receiver is subjected to overtly emotional component much harder to ignore and impossible to decypher. Here, the receiver must "search themselves for an answer" or understanding. As it is now, the receiver cannot take advantage of computers to generate complete messages. Messages which ordinary human behavior and psychological principles are used to unravel the intended meaning in responding to received verbal messages. Hence, an entire band of communication lies dormant and unused in textual communication, often times leaving little understood and counter acting communications.

Moreover, available techniques are mostly not applied in the textual communication arena. There is extraordinary need for automated methods to provide for a richer, more complete communication between individuals.

Facial Features and Emotive Content

Facial features are an excellent method of transmitting emotive content. In terms of recognition, faces are not simply body parts, like the eyes and nose. Instead, the face is composed of tectonic plate like pieces. Pentland's (Arbitron—MIT Media Lab) research at MIT led to a device for recognizing faces. He compiled a face database, a "facebase". He discovered a mosaic of about 100 pieces, which he called "eigenfaces", independent units. Using these categories, Pentland found he could describe anyone in his database, even though there were at least $10^200$ possible human faces.

Pentland claimed that "face recognition" or more generally interpreting people's faces, is a critical part of making machines, rooms, and cars be human-centric rather than technology-centric. Faces all convey meaning, sometimes in concert with other facial features or human attributes.

The human face, aside from all the other things it does, provides an incredible ability to communicate. We can convey an enormous range of feelings and thoughts through our faces. The raising of an eyebrow, the myriad number of looks in our eyes or the pursing of the lips can express so plainly, what our emotions are at any particular time. In a universe of faces, we can recognize a known one instantly and the transmitted emotions as well. Moreover patent application '624 offers a defined alphabet or emotive lexicon set for the transmission of emotive content via face glyphs and other methods, which can be used for reliable and precise textual communication.

Methods have been developed in '624, which use vectorized face glyphs to carry emotive content with text in addition to the conventional methods of emotive word and expression usage. These methods have not been exploited through emotive parsers in communications, response communications, profiling, decision-making, research, marketing, entertainment and many other applications which can make use of the emotive layer in communication. What is needed is an emotive lexicon set or "emotive alphabet" of faces for use in text, audio and video applications, which can facilitate transmission of emotive content between the various applications.

Response to Emotive Content

Some individuals may not respond to the embedded textual or graphical emotive content for any number of reasons. Some receivers may not wish to address the emotive content because it makes them uncomfortable, they may not recognize that they are receiving emotive content or only partial perceive it. Receivers may not have the language skills to formulate their response. They may not respond with emotive content out of fear or confusion. Receivers also may know that they respond automatically and wrongly giving them added hesitation or reluctance to attempt to identify and address emotive content. At times, relationships can get stilted or strained when communicating without emotion. The response to very subtle messages can be vital to a personal or business relationship. A perfunctory response which ignores or does not address portions of the received message can not only strain the relationship but may even be fatal. The objective in a response should be to restore understanding no matter how subtle or terse the message. Ways are needed to provide understanding in a more comprehensive, positive, cooperative manner.

Intended Meaning or Substantive Truth

At times the most important part of the message is unsaid or unclear. The listener relies on emotive content to interpret the message. Relationships are richer if this communication layer is used. Upon the death of the last California Indian, Ishii, one of his closest friends, Mr. Pope, wrote:

> And so stoic and unafraid, departed the last wild Indian of America. He closes a chapter in history. He looked upon us as sophisticated children, smart but not wise. We know many things, and much that is false. He knew nature, which is always true. His were the qualities of character that last forever. He was kind; he had courage and self-restraint, and though all had been taken from him, there was no bitterness in his heart. His soul was that of a child, his mind that of a philosopher.

Ishii was befriended and studied by Professor Kroeber, a Berkeley Anthropologist. During this time they exchanged language, history and culture as they learned to communicate with each other. How were the traits of "stoic" "unafraid" "wise" "kind" "courageous" "no bitterness" and "soul" transmitted to the people that lived with and studied Ishii? The language between Ishii and his new friends had to be learned and developed in a short time and therefore was never very good but on some level Ishii's communications and meanings were well understood and his character admired by his late found friends. Mr. Pope was even able to describe Ishii's soul in the passage above. These are observations are of substantial weight despite poor express language exchanged between parties. It is doubtful that we can achieve these types of insights and understanding through purely textual or verbal expression. The literature is replete with evidence which indicates that the quality of communication supercedes the verbal spoken or actual text of the communication. This kind of communication is richer in meaning and is almost innate to humans. It allows people to decipher meaning from mere words and expressions. As the world is made smaller through the Internet, many Ishii-Kroeber relationships develop through electronic communication. What is needed are ways to transmit and methods of intentionally embedding precise emotive content. Also needed are ways of inferencing intended meaning and substantive truth from communication without the benefit of physical proximity or visual interaction.

Rogerian Response

People reason and computers compute. The difference in communication is immense. Computer response was studied by Joseph Weizenbaum, who coded ELIZA at MIT during the years 1964-1966. The ELIZA program consists of two stages. The first stage used a parser to extract information from what the user typed into the program input interface, while the second stage used a script to formulate a suitable reply. This reply based on text input by the user, gave the user the feeling that a human was actually involved. Weizenbaum developed a script for ELIZA, which simulated a Rogerian psychotherapist. Another implementation is commonly known as DOCTOR. This was intelligent, as a Rogerian psychotherapist attempts to draw the patient out by reflecting the patient's statements back to him, and to encourage the patient to continue in the conversation. Rogerian techniques have been applied to electronic text processing as well. These are accomplished through text parsing, string editing through subject manipulation with pre-stored string fragments and grammatical string fragments synthesized in the form of questions. These techniques are well known but have not been yet applied to emotive content in communications. What are needed are applications which enhance communication and which add "human" intelligence to electronic devices.

Extraction of Emotion

The need to extract or infer emotional state or personality of the user by some technological, electronic or mechanical means is seen as an important step in capturing emotive information from senders publishers or authors. However, this step is rendered unnecessary if senders publishers or authors themselves are able to introspect, recall and embed emotive content directly into textual communication. The functionality, which allows users themselves to embed emotive state and associated intensity along with their textual communication, is contained in application '624. An emotive content format and protocol needs to be established in order for receiver applications and parsers are able to tokenize and assemble these in some prescribed order otherwise known as a grammar. What is needed are methods and standards which facilitate the encoding, transmission, decoding, parsing and programming of emotive layer content.

Computer Understanding of Communication

Natural Language Parsers (NLP) abound and there are many types; morphosyntactic, autolexical, cognative, construction, functional, categorical, head-driven phase structure, integrational, link, neurocognitive, stratificational, transformational, tree adjoining, contrastive, dependency-based, learning DCG-type, functional, linguistic, minimal information, generative, probabilistic, role and reference, syntactic, unification, etc. Most NLP parsers can accomplish the basic rudiments of recognition of keywords, proper names or other parts-of-speech. Technical term candidates can be based on automatic content analysis that includes part-of-speech tagging, lexical and syntactic analysis, as well as the analysis of the position and distribution of words. Content analysis can produce such things as estimations of essential information in a document and the term-likelihood of the candidates. For example, a morphosyntactic analyzer can identify basic linguistic features, using a syntax with a full-scale dependency parser and can show how words and phrases are functionally related to each other.

There are many public domain and shareware NLPs. Conexor or Cogilex are commercial NLP vendors among others, which sell NLP software components.

Software designed to read data-streams and tokenize sentences using the various grammar models, simple syntactic structures and complex structures can be found in the literature, public domain, free ware, shareware and commercial business arena. Parsers using dependency approaches based on lexical representation and grammatical rules or the processing of discontinuous text, speech transcripts, incomplete sentences, technical texts are commercially available.

These software packages can be programmed to tag noun phrases (NP), most verb phrase combinations (VP), apposition of NPs, non-finite structures, passives, small clauses, expletives, binary branching, etc. Source code to these types of parsers can be obtained and adapted to a particular application without undue experimentation or development. Most NLPs can parse out and tokenize the noun phrases to identify the subject matter, tokenize verb phrases for actions, and aid in formulation of appropriate grammatical structures for tense and conjugation.

Most NLP deal in lexicons, syntax, grammar, parts of speech, word relationship hierarchy, etc. There is the notable absence of emotive context and emotive content in NLP. Commonsense Knowledge Base approach is the nearest that current NLP comes and is seen by most as a failure. This deficiency of NLP is very restrictive on communication and understanding of textual messages. Moreover, this limitation of textual communication can breed misunderstanding and distrust between people, as an important layer of communication is systematically filtered out and text messages without the emotive component are misinterpreted.

Emotive Markup Languages

Text To Speech (TTS) programs and speech markup languages such as SABLE, SSML, STML, SML and JSML adapted to carry emotive content are beginning to emerge in research environments. SML supports only a few emotions; anger, sadness, happiness and fear. The methods used are only at their infancy stages, cumbersome and in need of more comprehensive more encompassing models for encoding, transmitting representing and parsing emotions in electronic communications.

Emotive Markup Language attempts currently use, explicit emotional indicators, which are translated into emotive states. In those applications, emotive states are limited to less than 10 and there is no associated emotive intensity. There is no attempt to translate between emotive states, which are same or similar but use different names. Apart from the related references '624 and '758 there is no concept of emotive vectorization, emotive intensity associated with a directed emotive state, or emotive vectorization and associated text, nor the concept of emotive normalization to the author. What are needed are standards for implementing emotive vectorization, emotive normalization and for a more precision in emotive content in communication.

Intended Meaning

Language carries alternate meanings and words carry weight. Parsers currently do not discern the alternate meanings of language colored by emotive expression. Parsers do not currently weigh words but people do. What is needed are parsers which can parse a communication transmission with embedded emotive content along with the cognitive content, tag the emotive lexical tokens and retain the relationships to the associated text. What are needed are parsers that can promote alternate selectable grammars aligned with the various social and cultural protocols to identify and promote the otherwise filtered or obscured meaning in a communication. What is needed are parsers which can inference meaning from textual and emotive content communication for intended meaning to determine the author's intent despite linguistic ambiguity, ambiguity which tends not to exist where the communication is within physical proximity to enable the receiver to discern the associated emotive context within which the textual communication lives.

Computers currently are not programmed to reason. That is partially because they cannot weigh words or discern meaning. At times what is not said is more important than what is said or how it is said carries the meaning instead of what is said. These are components that are currently missing from electronic communication. Reasoning dictates that the reasoner incorporate thoughts, feelings and wisdom into understanding. Thoughts can be represented by textual symbols and feelings can also to a certain degree. Thoughts can also be represented by diagrams and numerical models, but feelings have not been so represented by any precise method for many reasons, the best reason is that it is too difficult to fathom much less accomplish. What are needed are methods to facilitate emotive representation, the "unsaid" or the "how said", in conjunction with other communication streams so that richer and more comprehensive communication can transpire.

Emotive content carries an invisible dimension in intelligence, artificial or otherwise. What are needed are adequate methods and standards, which can accommodate textual, audio and video applications with connectable emotive as well as conventional content. What are needed are file and transmission formats, which can accommodate a standard emotive content layer in parallel with the current content such that the emotive meaning can be communicated when lacking physical proximity.

SUMMARY OF THE INVENTION

This invention discloses a system and method to exchange precise emotive intelligence, in the form of emotive vectors, through electronic communications. This also includes the embedment, encoding, decoding, parsing, processing and presenting. An Emotive Parser parses emotive content embedded in the message for the purposes of revealing the intended meaning to the receiver.

The present invention discloses a method of communicating emotive content embedded in communications on computer device applications executing over a plurality of communicatively connected computing devices. The methods include, 1) encoding emotive content into the communication which can be transmitted from sender to receiver computer devices, 2) decoding and decoupling the emotive content, 3) parsing out emotive grammars for processing and display of the emotive content with associated textual content on receiver computing devices. Emotive representations include such techniques as mapping the emotive vectors to face glyph representations, from an emotive graphical set of face glyphs, which are displayed to receiver along with associated text in ways to quickly reveal the intended meaning of associated textual content.

BRIEF DESCRIPTION OF THE DRAWINGS

These and further aspects of the invention, may be better understood with reference to the accompanying specification and drawings depicting the preferred embodiment, in which:

FIG. 3A contains a table describing an emotive state set of characters in alphabetical order with associated hex code order, Graphic Name, Label and character.

FIG. 3B contains the continuing table of FIG. 3A describing an emotive state set of characters in alphabetical order with associated hex code order, graphic game, label and character.

DESCRIPTION OF THE EMBODIMENT

Objectives

Objectives of the invention in no particular priority are as follows:

To establish a standard emotive face glyph character set for the purposes of encoding, transmitting and decoding precise emotive content in electronic communication.

To enhance communication with author normalized emotive vectors with associated text for embedment and presentation of precise emotive content in electronic communication.

To establish methods and standards for encoding, transmitting, decoding lexical tokens and grammars for parsing of data-streams with emotive content in electronic application communications.

To provide methods to perceive, appraise, translate and extract intended meaning in communication such that verbal or textual expression can be weighed and evaluated for substantive meaning in the human sense, much as one weighs the communication of a visual perception or audio heard message looking to the speakers facial expression and other emotive signals and characteristics.

Cycle of Operation

A simple cycle or mode of operation over a computer network would involve a plurality of computing devices on a network with computing devices which can display graphical and textual output. Applications executing on these devices would facilitate exchange of emotive vectors from emotive information by associating author emotive state with author normalized emotive intensity, assembling emotive content by associating emotive vectors with associated text, encoding emotive content by preserving association of emotive vectors with associated text and transmitting the communication with emotive content to one or more receiver computing devices. Receiving computing devices would parse communication for mapping emotive vectors to face glyph representations from a set of face glyphs. Emotive intent strings can be synthesized from the emotive and associated text parts of speech components. Resulting textual and associated emotive representations on the computing device display provide a method whereby communications encoded with emotive content provide means of exchange of precise emotive intelligence.

Hardware Context

Figure 1:
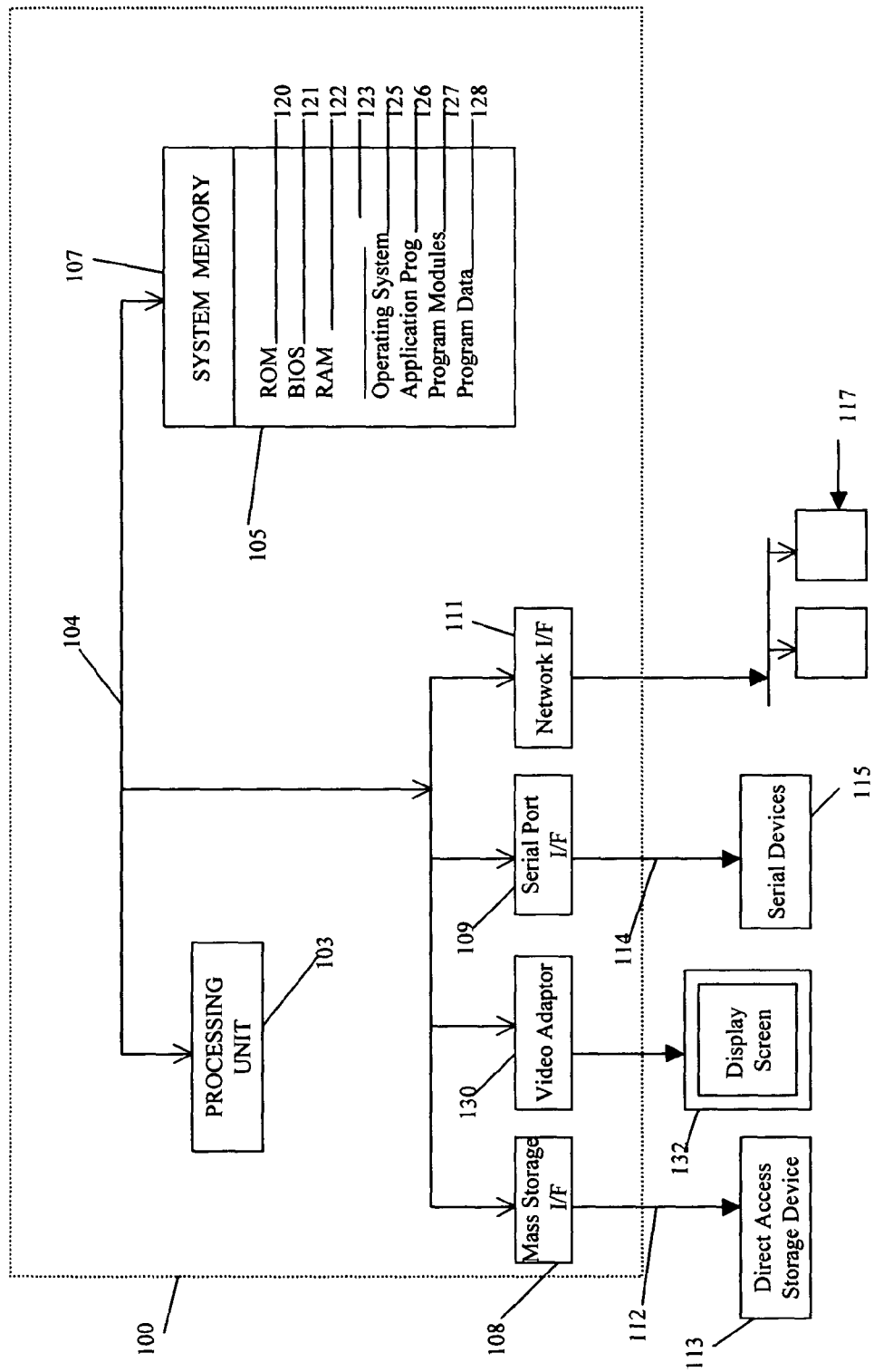
FIG. 1 is a block diagram illustrating a typical computer system for carrying out aspects of the present invention.

FIG. 1 is a diagram showing a computer system 100, which can host application embodiments of the invention. In one embodiment, the computer system 100 is a typical networked personal computer workstation with at least one Central Processing Unit 103, Memory 107, network interface card 111, Display Screen 132, Mass Storage interface 108 for such devices 113 as hard drive(s) removable disk drives, optical disk storage, floppy drives, I/O buses 112 and 114, Memory Buses 104, etc. For purposes of illustration, embodiments of the invention are provided in the context of a word processor, publisher or email applications program and their requirements.

Computer system 100 includes at least one processor unit 103, which obtains instructions and data via a system bus 104 from a main memory 107. Illustratively, the processor is a PowerPC available from IBM or a level of Pentium processor from Intel. More generally, however, any processor configured to implement the methods of the present invention may be used to advantage. The main memory 107 could be one or a combination of memory devices, including Random Access Memory 122, dynamic, nonvolatile or backup memory, (e.g., programmable or Flash memories, read-only memories, etc.) and the like. In addition, memory 107 may be considered to include memory physically located elsewhere in a computer system 100, for example, any storage capacity used as virtual memory or stored on a mass storage device 113 or on another computer coupled to the computer system 100 via system bus 104. Illustratively, the main memory 107 contains executable programs, which manage the hardware and control the software programs 105. The ROM 120, BIOS 121, and Operating System 125 are a system of programs, which manage the hardware and software resources for the use and running of application programs. The memory 107 further contains application programs 126 specifically, a email, word processor, text editor, publishing tool, web builder etc for purposes of an embodiment of the invention. In one embodiment, the application is an email application. Since email applications have been ported to almost all platforms and operating systems currently in use in the market place, these can all eventually benefit from aspects of the present invention and serve to broaden the scope of the invention. Program modules 127 and Program data 128 would typically also be resident in main memory 107 along with other programs 125 which can be paged or swapped in from other memory sources, local 108 or networked 117. Software components and objects are but parts of programs, which reside together in various regions of addressable memory and are executed to produce the necessary application functions. Software components and objects themselves can be broken down into data structures and programming logic which use the data structures. Generally, program modules 127 include processes, programs, objects, components, data structures, etc. that perform particular tasks or implement particular abstract data types.

The computer system 100 includes a number of operators and peripheral systems. Illustratively, these include a mass storage interface 108 operably connected to a direct access storage device 113, which can be such devices as hard disks, optical disk drives, floppy disk drives, optical storage, at least one input/output (I/O) interface 109 operably connected to I/O devices 115 such as modems, wireless broadcaster devices, audio, communication via serial protocol bus 114 such as IEEE 802.xx, Firewire, RS232 etc, and a network interface 111 operably connected to a plurality of networked devices 117 which can be mass storage, other computers, wireless devices and other networked devices. The I/O devices 114 may include any combination of displays, keyboards, track point devices, mouse devices, speech recognition devices and the like. In some embodiments, the I/O devices are integrated, such as in the case of a touch screen or display panel. The networked devices 117 could be displays, desktop or PC-based computers, workstations, or network terminals, wireless handheld or other networked computer systems. As such, aspects of the invention can be practiced on a single computer system as well as over a network of computer devices.

A number of program modules may be stored on the mass storage device 113, ROM 120 or RAM 122, including an operating system 125, one or more application programs 126, other program modules 127, and program data 128. A user may enter commands and information into the workstation 100 through input serial devices 115 such as a keyboard or pointing device. Other input devices (not shown) may include a microphone, joystick, game pad, satellite dish, scanner, or the like. These and other input devices are often connected to the processing unit 103 through a serial port interface 115 that is coupled to the system bus, but may be connected by other interfaces, such as a parallel port, game port or a universal serial bus (USB). A monitor 132 or other type of display device is also connected to the system bus 123 via an interface, such as a video adapter 108. In addition to the monitor, personal computers typically include other peripheral output devices (not shown), such as speakers and printers.

The personal computer workstation 100 may operate in a networked environment using logical connections to one or more remote computers, such as a remote computer 117. The remote computer 117 may be another personal computer, a server, a router, a network PC, a peer device or other common network node, and typically includes many or all of the elements described above relative to the personal computer 100. The logical connections depicted in FIG. 1 include a local area network (LAN) and a wide area network (WAN). Such networking environments are commonplace in offices, enterprise-wide computer networks, intranets and Internet.

When used in a LAN networking environment, the personal computer 100 is connected to the local network 117 through a network interface or adapter 111. When used in a WAN networking environment, the personal computer 100 can connect via modem 115 or other means for establishing communications over the wide area network 117, such as the Internet. The modem 115, which may be internal or external, is connected to the system bus 114 via the serial port interface 109. In a networked environment, program modules depicted relative to the personal computer 100, or portions thereof, may be stored in the remote memory storage device. It will be appreciated that the network connections shown are exemplary and other means of establishing a communications link between the computers may be used. Computing devices with wireless communications such as PDAs or other handheld devices may be used.

Emotive Alphabet—Encoded Glyph Tokens

Figure 2:
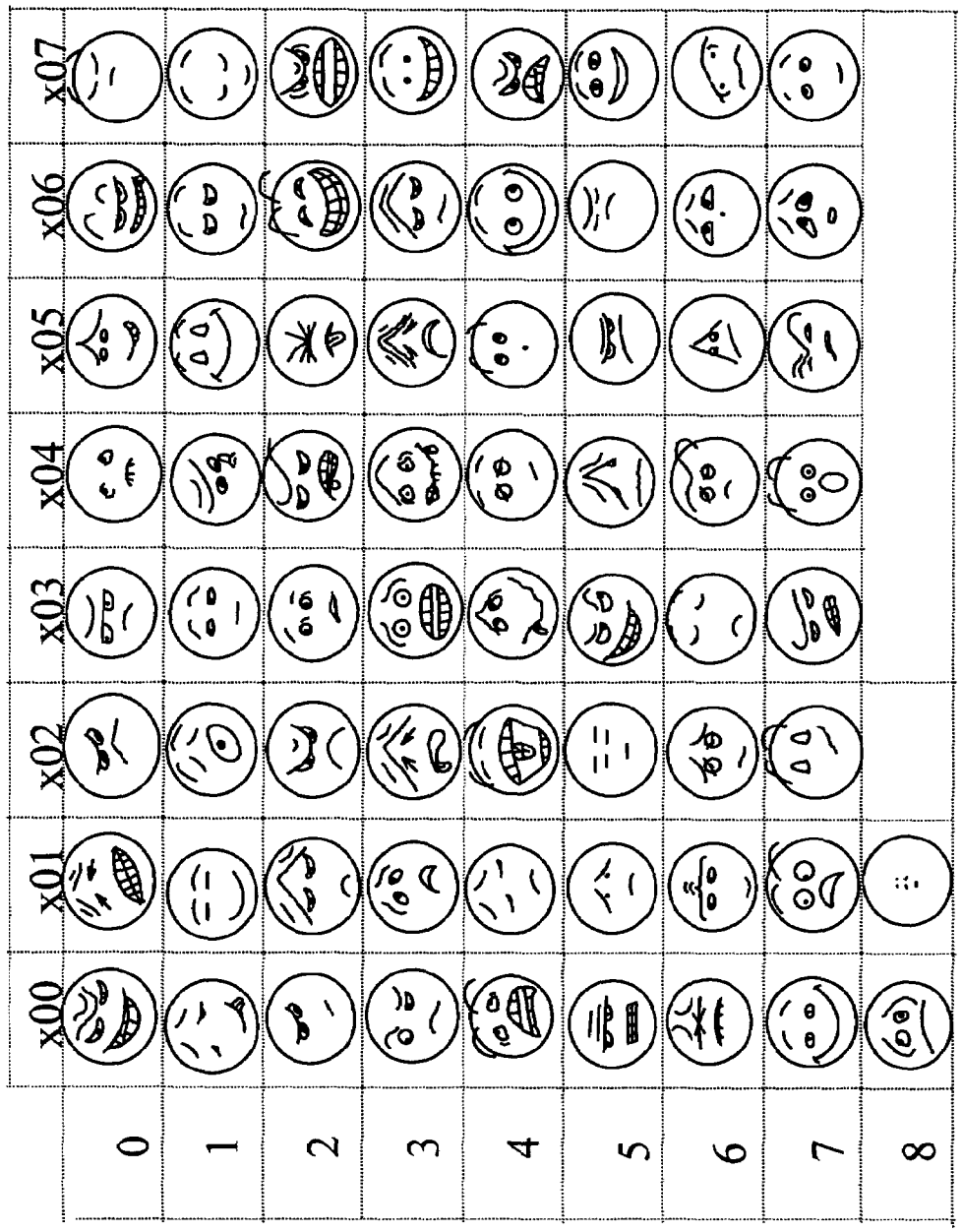
FIG. 2 is a depiction of an exemplar emotive state alphabet of characters to be used in an embodiment of the invention.

Referring now generally to the Figures and particularly to FIG. 2, FIG. 2 is a illustration of an exemplar emotive state set of characters used in an embodiment of the present invention. An aspect of the invention discloses means for encoding, decoding and parsing emotive content in textual communications. The emotive content comes in two basic forms, express language textual communication and embedded graphical representations bearing emotive states with associated intensities. An emotive state set of primitives set shown in FIG. 2 provides a glyph set which serves as a basic emotive alphabet in an embodiment of the invention.

The emotive alphabet of primitives provide a library of glyphs which represent the emotive information for embedment, transmission and presentation of the emotive layer in communication and which provide a means for accurate and precise transmission of emotive content in electronic communication. An embodiment of the invention establishes a set of graphical primitives enabling senders-authors to present or display emotive information by watermarking a selected emotive state and associated intensity face glyph in association with textual communication. In an embodiment of the invention this lexical emotive set or emotive alphabet is comprised of a set of 66 face glyphs shown in FIG. 2. Each face glyph shown in FIG. 2 is listed in the tables in FIG. 3A or FIG. 3B in corresponding face glyph emotive name alphabetical order. Each emotive state entry in the table of FIGS. 3A and 3B has associated fields containing the hexadecimal code, emotive state name, and label and character information.

In an aspect of the invention, the author of the communication can also be the sender, publisher, effective transmitter or actor of the communication. This aspect of the invention establishes that the emotive vector is normalized to the author, which is comprised of an emotive state and an associated emotive intensity selected by or from the perspective of the author's emotive state and range of emotive intensity. The author is synonymous to the effective transmitter, sender or publisher and the emotive intensity is normalized to the authors range scaled subjectively from a lowest to highest intensity. The emotive state together with associated emotive intensity, also called emotive vector, is further associated with text, constituting emotive content. Applications such as word processors, email or publishing are likely candidates for emotive content transmissions across computer devices. Furthermore, authors are synonymous with the subject actor or speaker in audio or video applications which can also transmit emotive content. Hence, in a video application the emotive content is associated with the applicable effective author of the communication and the emotive intensity is normalized in a given range of the author or speaker artifact in the communication. An encoding of emotive content with text would comprise a position accounting in the file or datastream from which the emotive content could retain its emotive vector and association with verbal spoken words of the speaker in the audio or video channel for concurrent output.

In one embodiment for encoding and decoding for transmission, emotive content would be structured in an array in a datastream as follows:

| ES | EI | AS |
|---|---|---|
| Emotive State | Emotive Intensity | Associated Text String or pointer |

Figure 7:
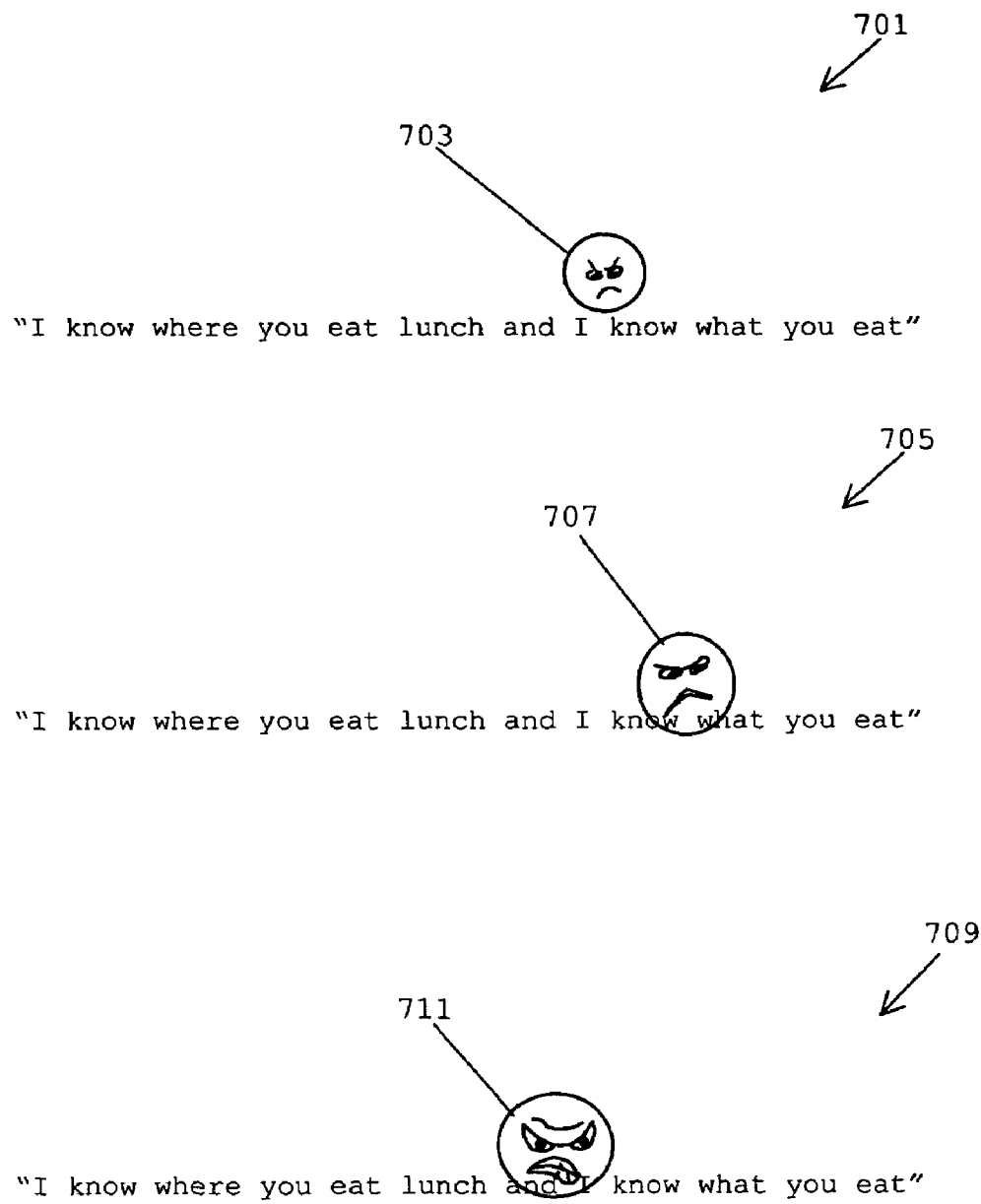

In a specific example, the 0x0001 offset in the FIGS. 3A and 3B hex code field is ANDed with an emotive state character hexidecimal code to encode and decode emotive state for a particular standard code or numerical slot assigned in the Unicode Standard. An offset is used with the emotive character number to map the character into the assigned slot. The example of an aspect of the invention is assigned a code plus offset value of 0x1002 to encode the communication shown in 701 of FIG. 7, 0x1000 is the offset and 0x0002 is the emotive state (ES) from the table in FIG. 3A. The communication 701 contains the emotive state ANGER, ES3, slot position code 0x1002, at emotive intensity (EI) of three, EI=3, and with associated text string (AS) "I know where you eat lunch and I know what you eat."

Encoding communication 701 in the encoding scheme of a Unicode Standard using the ASCII set for the letters and numbers would result in:

ES=Emotive State=\u1002 is the Unicode encoding Emotive Glyph Angry, label ES3 for graphic character
EI=Emotive Intensity=ASCII 3=0x0033
AS=Associated String="I know where you eat lunch and I know what you eat."
=
00490020006B006E006F0077002000770068006500720065002000790066f0075002000650061007
40020006c0075006e00630068002002000610006e0
064002000490020006B006E006F00770020007700680610074002007900
6f00750020006500610074002e Hence an encoding for 701 Unicode transmission would resemble:

\u1 002003300490020006B006E006F0077002000770
06800650072006500200079006f0075002000650
06100740020006c0075006e0063006800200061006
e006400200049002000060B006E006F0077002000770
068061007400200079006f007500
200065006100740002e

The Unicode Standard does not define glyph images nor how glyphs are rendered, only how characters are interpreted. The software or hardware-rendering engine of a computing device is responsible for the appearance of the characters on the display screen. The Unicode standard does not specify the size, shape, nor style of on-screen characters but the representative codes or slot positions defined for a particular character. In an aspect of the invention the emotive parser semantic routines described below could direct and manage the emotive related rendering of the emotive face glyphs, directing the particular size, shape, style of glyph at the policy position of rendering the optimal combination of graphics and text.

Essentially, encoding the three parameters ES, EI, and AS for the 701 communication into UNICODE format would carry the emotive content along with the textual communication from transmitter device to receiver. In this embodiment, we encode a communication with emotive content into standard computing device transmission format for communicating emotive content in emotive vector author normalized form embedded in computer device communications for transmission to receiver computing devices.

Non-Graphical Emotive Content

"Feeling" words are pre-defined language connoting emotive states and for which there are in addition also pre-defined emotive state modifier words which linguistically operate on the feeling words to modify the emotive intensity. Thesaurus and dictionary extensions of the emotive set in FIGS. 3A-3B can offer the start of such "Feeling" words. An example set emotive qualifier words are shown in Table 1. Feeling words are keywords tokenized by the parser and translated into emotive state and accompanying qualifiers. These are further processed and translated to emotive vector form in face glyphs and intended text meaning strings. The pre-defined feeling keywords are maintained in data structures for access in parsing the communication and tokenizing into program objects which can be identified, modified for root, tense or part of speech for concatenation with stored string fragments to form grammatical but not necessarily complete sentence stings. These words are tokenized from the communication and selected for concatenation as emotive components into the pre-stored string fragments at a particular blank space slots which grammatically complete synthesized strings for emotive intent and more.

In an embodiment of the invention, pre-stored string fragments come with "slot(s)" for appropriate positions for various parts of speech components as dictated by a grammatical analyzer. Stored sentence fragments may have more than one "slot" to accommodate the various parts of speech components which are concatenated with generic connective grammatical strings stored Pre-stored string fragments can include stored memory data structures as lists, arrays, queues, databases, structures, or other types of data structures which can be fetched as data objects in executing programs. Such data structures can also contain emotive word and associated intensity modifier words in a program accessible formats.

Accommodating Emotive Content Encoding

File formats and standards can use a basic emotive alphabet set of face glyphs such as the 66 face glyphs introduced in FIG. 3A and FIG. 3B to transport emotive content by encoding representatives of the graphical face glyphs. Moreover, it would seem appropriate that alternate emotive character sets are developed for the different languages, peoples and cultures which would use such an emotive face glyph standard set. Emotive character sets should closely resemble the facial expressions commonly accepted and understood for a particular language or culture. Thus any one emotive state face glyph would not necessarily be identical between peoples and cultures and the presentation of the graphical representation of an emotive vector through a particular face glyph would reflect the language and culture group adopting a particular set for use on their display devices.

Emotive content can be rendered through application or Operating System policy in the presentation managers of the various graphic systems in the form of defaults, screen or display placement, type of representation for the emotive intensity parameter, color, etc. Some of these methods shown in reference related '624.

In an embodiment to accommodate encoding of emotive content into some popular standard file or transmission formats using a character set of face glyphs, three primary parameters of emotive content should include 1) Emotive State, 2) Emotive Intensity and 3) Associated Text. Emotive State is essential but the emotive intensity and associated text variables can be defaulted or NULL.

XML Format

In order to carry emotive content with emotive vectors normalized to author, an emotion set of keywords would be available, such as the set in FIGS. 3A-3B in conjunction with ranges of emotive intensities. In an embodiment of the invention, applying the vectorized emotive content, emotive state ANGER at emotive intensity value six in the range from 1 to 10 is the keyword, in XML like Emotive Vector Markup Language (EVML) using ANGER for the emotive state keyword a code snippet would appear as:

<evml>

<ANGER-6>I know where you eat lunch and I know what you eat.</ANGER-6>

</p>

</evml> where the dash inside the emotive keyword would demark the following associated emotive intensity. The start and end emotive keyword conveniently serves to bound and preserve the associated text of the emotive content and depending on the display manager policy could display as in communication 705 in FIG. 7.

Constructing the Encoding Emotive Content API

A programmer interface for the encoding of emotive content will consist of several input parameters. An Application Programmer Interface implementation and for an aspect of the invention is an API function EncodeFunc for encoding emotive content into a datastream. EncodeFunc has three input parameters; 1) x the Nth Emotive state in the communication represented from an emotive set such as one in FIGS. 3A-3B, 2) y the associated intensity from a range of intensities for the x emotive state, 3) txt the emotive vector associated with subtended or selected text.

EncodeFunc(Emotive_State_N x,

Emotive_Intensity_N y,

Associated_text txt)

Where:

x name, code oor label of character in FIGS. 3A-3B, y integer in the range of 1 to 10, txt associated string array or pointer Transmission of Emotive Content In order to retain cognitive and emotive content in transmission and reception, emotive content must be packaged to preserve its association with text in the transmission. This is supported by establishing a known set of emotive primitives between the sender/transmitter and receiver such that and encoding-decoding scheme for a particular datastream transmission can be collaborative. Thus the encoding scheme shown above must be adopted by for the beneficial transmission and reception of the datastream.

As an aspect of the invention, the emotive content is encoded with the text in such manner as to facilitate the transmission of the emotive content without loss of its connection with its associated text by illustration with the UNICODE standard. Furthermore, for audio or video applications, the audio channel when converted to text and vice versa, emotive content can be encoded, transmitted and decoded as shown above for the textual communication.

Textual, Audio and Video Applications

Figure 4:
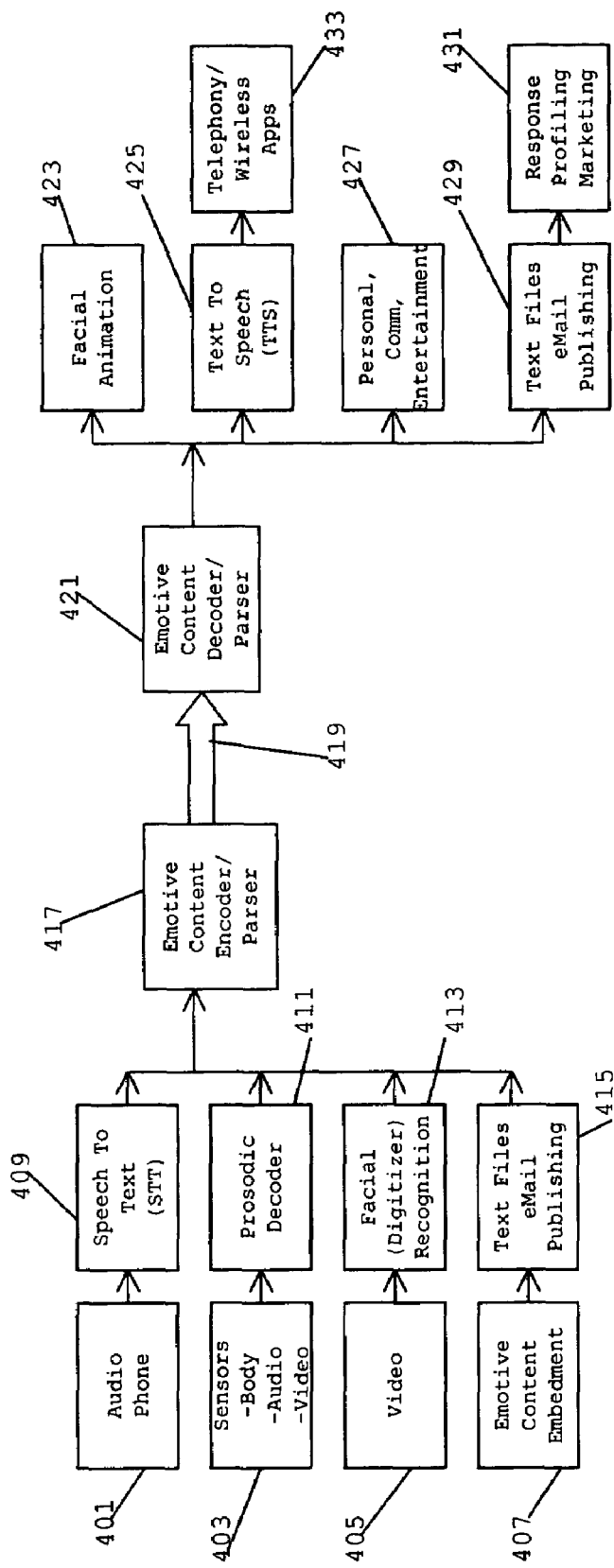
FIG. 4 is a map illustration of applications and where they fall with regards to emotive content data-streams

Referring now generally to the Figures and particularly to FIG. 4, FIG. 4 is a map illustration of applications and where they fall with regards to emotive content datastreams. Aspects of the invention for embedding and encoding emotive state vectors with text can be applied to transmit emotive content with textual communications as well as with audio and video applications.

A mechanism used to obtain, gather or infer a users emotive state from video, audio or other media, would be used to provide inferential emotive content in lieu of author selected, encoded into an emotive state character set and transmitted along with an associated channel to a receiving application and reconstituted on the receiver end. For example Audio 401 applications, Speech to Text (STT) 409 generally filter out emotive content when converted to text. However, with sensing devices and prosodic decoders 411, the emotive content can be extracted from the audio portion of the audio channel and converted to emotive vector data-streams which retain their association with the text strings from the audio communications from which they are extracted. The extracted and decoded emotive content layer can then be encoded with the STT 409 datastream in the Emotive Content Encoder 417, which takes the emotive content from Prosodic Decoder 411 output in the form of emotive vectors with marker associations within the STT text datastream and merged with the STT datastream from the STT 409 by encoding the emotive content into the text stream in the Emotive Content Encoder 417.

Analogous to the audio, Video 405 applications can be used to provide input to Facial Recognition 413 applications. Face Recognition applications digitizing facial features can provide input to face emotive recognition. Picture and Video 405 applications producing data-streams in a various video format including but not limited to JPEG, MPEG, NTSC, AVI, etc can be used in the Facial Recognition 413 application by splitting off or decoupling the emotive content from the video stream or picture format. The decoupled emotive content stream in one embodiment would contain association pointers to the video stream subject instances from which the facial digitization was extracted. Using current face recognition techniques and emotive normalization to extract emotive states from facial features in conjunction with emotive content streams to encode emotive content into the audio and video channels, one skilled in the art could process and merge the extracted emotive content in the video stream into the emotive content encoder 417. The accompanying audio channels can also be concurrently processed through a prosodic decoder 411 and in concert with a facial digitized 413 information, emotive expressions can be established, marked and associations can be drawn from the separate channel video and audio analysis for consistency and accuracy using the different input mode inferences of common emotive events. The separate applications and channels of emotive content can be used to verify or fill in gaps to improve accuracy from the different mode inference emotive content.

Author-sender emotive content embedment 407 in textual applications 415 such as word processors, email and publishing can also be accommodated by aspects of the invention by encoding 417 and transmitting the textual 415 application data-streams to receiving applications through electronic communication stream formats 419 to other wired or wireless electronic applications 423 425 427 429 432 433 in operating on computer devices.

Emotive layer data-streams which reach the heretofore emotive content unaware applications, these application islands become connected via the emotive content layer in communication. Such connected applications which can exchange emotive content between and among communication electronic applications each enhance the application by an extra dimension of communication and add functions and features which make the application more amenable to personal use. For example, adding the extra dimension of emotive content into an email 429 application allows users to express themselves in less text, communicate with other users who do not speak the same natural language or understand a language well, share more of themselves, relate better, establish and build deeper relationships, etc. In addition, additional applications such as Response Profiling 431 of Emotive Content, voting and other related applications arise because the incoming data-streams contain new information which was unavailable previous to embedded emotive content transmissions. Facial Animation 423 applications can offer emotive expression synchronized to accompanying audio and video channels, Text To Speech 425 applications are enhanced to include the accompanying emotions transforming robot-like to more human like speech rich with emotive content, Telephony and Wireless Applications 432 can display emotive face glyphs which reduce need for text input and communication can be on a deeper or more personal level. Thus emotive content data-streams can be exploited for many beneficial uses. The author-sender emotive normalization, emotive vectorization and text association aspects of the invention create a precision in emotive expression which provide means to embed, encode, transmit and decode the emotive content. This emotive content can be standardized across file formats, transmission standards, platforms, applications and devices.

Scan Parse and Present

Figure 5:
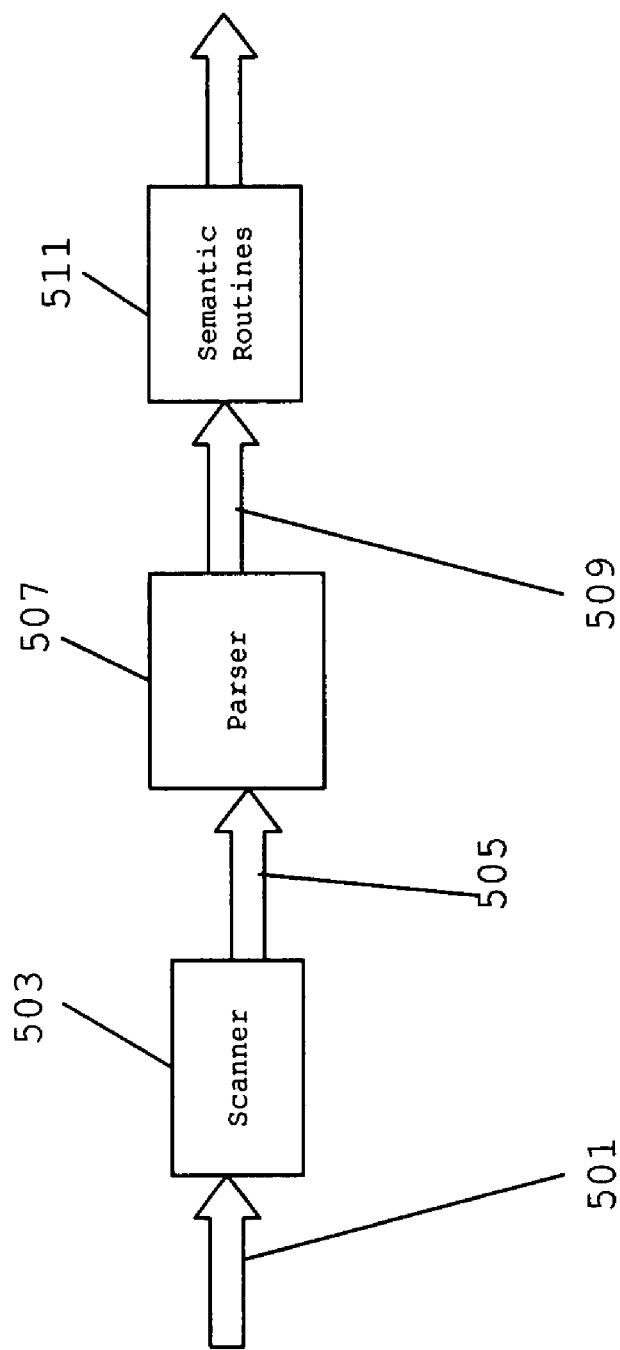
FIG. 5 is a high level illustration of an Emotive Scanner, Parser, Semantic Routines Flow Chart

FIG. 5 is a high level illustration of the data flow from reception of a communication with emotive content as the datastream is processed in an Emotive Scanner 503, Parser 507, Semantic Routines 511. Data-streams 501 containing emotive content are read in by the scanner 503, which acts as a lexical analyzer to convert the character datastream into tokens. In the example above for the encoded communication 701, the scanner would decode the ES, EI, and the associated text (AT) as tokens 505 to be inputs to the emotive parser 502. The tagged and labeled characters 505 are processed by the parser 507 for patterns of an established emotive grammar.

Decoding Emotive Content

Another aspect of the invention is to provide capability to extract any textual or graphical emotive content from an electronic communication. In one embodiment the receiver 421 and sender 417 in FIG. 4 coordinate on a scheme, standard or protocol for the transfer of graphical emotive content whereby emotive character set exchange by both sender and receiver is established and used by the sender 417 and receiver 421. Non-graphical methods are available as well and can be applied as per the above reference '624. Non-graphical techniques would comprise parsing the textual content for feeling words and accompanying modifiers followed by conversion of these to emotive states and an associated intensity. With the establishment of an exemplar emotive primitive set in FIG. 3A and FIG. 3B as the lingua franca between sender and receiver, senders can embed numerical characters encoded for graphical emotive states eliminating the need for transmission of digitally expensive graphical figures. An API for the decoding of emotive content may act substantially in reverse of the encode function, extracting ES, EI and AS from a read in datasteam as tokens. For example a \u1002003 read from the datastream would be recognized as the emotive vector (ANGRY,3) which would be followed by an associated text string or NULL. From an API structure, this may appear as:

DecodeFunc(Emotive State, Emotive Intensity, string pointer, text region subtended)

Where DecodeFunc is the name of the decoding function and the output parameters are similar to the EncodeFunc parameters shown above. This embodiment illustrates the decoding of emotive content in electronic communication bearing emotive vectors normalized to the communication's author sender.

Natural Language Parsers (NLP)

Strings can be processed into target appropriate grammatical sentences constructed from the appropriate tense noun phrase tokens, appropriate conjugated verb phrase tokens, and appropriate stored string fragments to connect the parts of speech tokens into topic or supporting sentences. In one embodiment the embedded emotive content is tokenized at the lexical stage and further processed in accordance with a grammar which operates at a level just above a natural language parser. Thus, an aspect of the invention is to use natural language parsers for much of the textual parsing effort, adding the emotive tokens when needed in analysis or construction of the information strings for communication receivers and viewers.

Emotive Parser Grammar and Productions

While the emotive states and their associated intensities provide the alphabet or lexical tokens, the modes of human behavior protocol provide the grammar or rules of communication protocol. The general approach to communication received would be to provide a systematic and comprehensive response to all content in received communication. In an embodiment of the invention, an emotive parser constructed with emotive grammar productions to tokenize emotive content in data-streams will parse communications containing emotive content.

An aspect of the invention processes emotive and cognitive content by 1) decoupling the cognitive from the emotive, 2) identifying the elements of the cognitive content and the states and associated intensities of the emotive content, 3) applying generally accepted effective communication techniques, emotional knowledge and cultural norm rules, and 4) generating presentation to the output device such that the receiver can understand see the full textual content of the message displayed and as well as the emotive message in the form of face glyphs, color, glyph density and placement of glyphs, explanatory or emotive intent messages requested by reader. Some requests are triggered by display focus device pointer such as cursor dwelling on a particular glyph.

Described in a more rigorous fashion, in a typical NLP front end, sometimes called a scanner, individual characters in a character stream are grouped into tokens which are composed of identifiers, reserved words, delimiters, pointers to stored string buffers, etc. An aspect of the invention introduces emotive tokens, which carry the emotive state, emotive intensity and association information to a text string. A full set of the AS, AI, and AT trigger a parser production here named an emo-statement. In one embodiment, the emo-statement tokens are defined as an encoded series of bytes which include the emotive state, emotive intensity and string of associated text. In one embodiment, the emotive state and emotive intensity would be encoded in the byte stream directly ahead of the associated text string.

Typical parsers keep account of tokens and different structures such as trees, arrays and composites are used. Given a formal specification, groups of tokens, specified by productions or grammar rules, are operated on in accordance with those rules by semantic routines. An embodiment of the invention uses an emotive parser which addresses the emotive content and it's associated text as tokenized per emotive content. The emotive parser is structured "above" an underlying typical parser, applying productions before the underlying NLP would apply its' productions in a typical example as following:

<program>→begin <emo-statement list > end where begin and end are the message delimiters, and emo-statement is emotive content and its associated text (ES, EI, AT or pointer to text and associated text)

The productions for an emotive content parser embodiment may appear as following:

<message>→ SOM <emo-statement list> EOM

<emo-statement list>→ <emo-statement list>{statement list}

<statement list>→ <statement> <statement tail>

<statement tail>→ lambda (=empty or NULL string)

<statement tail>→ >statements> <statement tail>

Semantic Routines

Semantic Routines 511 are triggered by instantiated productions in the parser 507. Emotive productions trigger such semantic routines as the placement of face glyphs, color or shading of glyphs, application of emotive intensity to emotive state representation such as a face glyph by increasing or decreasing glyph size, glyph density or glyph facial features, etc. Semantic routines could also create the focus text boxes, which would contain emotive intent descriptions directed at cognitive portions of the associated text and emotive state and intensity for viewers on demand, the authors motivation or emotively intended meaning. An aspect of the invention uses stored connective strings to concatenate the textual emotive state and intensity with the appropriate parts of speech from the emotive content associated text to display in the focus popup text area boxes that appear when the cursor or screen selection pointer device is dwelled on a particular face glyph.

Figure 8:
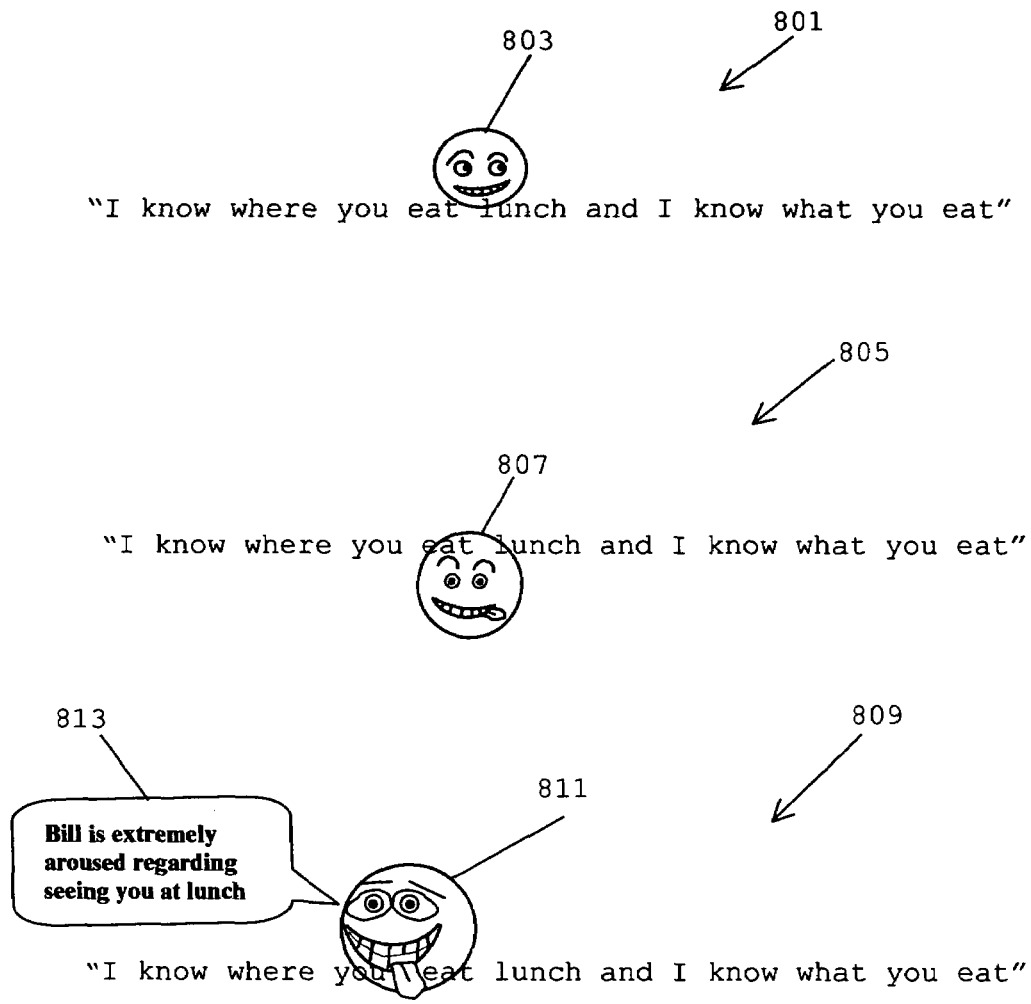

For example in the FIG. 8 communication 809 where the emotive content ES=AROUSED, EI=9, and associated the text "I know where you eat lunch and I know where you eat."

The parts of speech tagged by the underlying NLP would yield

"I know where you eat lunch and I know what you eat"

P V Prep P V N C P V Prep P V

The emotive tokens would be ES=AROUSED and EI=9. The symbols below the word represent parts of speech in the associated text: P=Pronoun, V=Verb, Prep=Preposition, C=Conjunction In an embodiment of the invention, semantic routines create an intended meaning string from pre-stored connective word strings, the underlined text shown in the example, with parts of speech slots filled in with author's name subjects objects etc. of the associated text, emotive state and intensity qualifiers from parsed and translated emotive components. From the parsed associated text 809 communication, a semantic routine would create the emotive intent string:

| Bill is extremely aroused at the prospects of eating, lunch, with |
| A    EI    ES                                    V       N |
| you. |
| P |

The EI string is derived from the numerical value of the parsed EI by using a pre-stored table translation associating an emotive state qualifier word phrase with the EI numerical value. In an embodiment of the invention the table below would serve as the translator between a decoded emotive intensity value into a text string substitute in accordance to a Table 1 translation. In translating from numerical to narrative language, an aspect of the invention maps the emotive intensity numerical value in the emotive intensity range to text word approximating the value in the range.

TABLE 1

| Emotive Intensity | Text Usage Translation |
|---|---|
| 1-3 | mildly |
| 4 | somewhat |
| 6-7 | very |
| 8 | very much |
| 9-10 | extremely |

Decoupling Cognitive and Emotive Content

An aspect of the invention identifies methods of decoupling the emotive content, frequently thought of as the irrational component or illogic, from the cognitive thinking textual content, and concatenating strings in a grammatical sequence forming the rudiments of felt expression and emotion response. Aspects of the invention can be made into a complete reasoning model for application in uncertain or ambiguous reasoning environments as demonstrated in the emotive intent meaning constructed in the directly above example from the ambiguous associated text string in conjunction with the emotive content. A series of emotive states and intensities could also form an emotive message which affects and colors the textual meaning intended in the textual portion of the communication. This is illustrated by tokenizing the emotive content as well as the associated text for the parts of speech for purposes of synthesizing strings using the emotive components and parts of speech. The synthesized string contain the influence of the emotion on the cognitive, appearing much more like reasoning than logic alone offers. Alternative meanings of the textual content from multiple entendres can also be decoded and parsed using cultural, social and statistical standards in deriving intended meanings, made possible through the decoupling of the emotive components from the textual content. The decoding, parsing, processing of datastream for emotive content through grammar productions and semantic rules can all be currently done by one skilled in the art. The parsed and tokenized emotive content is formatted and processed for presentation and display of face glyph representations with associated textual content on receiver computing device display.

Another aspect of the invention creates reports with emotive motivation or emotively intended meanings strings using assorted connective string fragments connecting emotive state strings into sentence or fragment strings. Still another aspect of the invention would provide semantic routines which can perform statistical analysis or emotive profile for display in reports or in interface presentation components such as on cursor dwell text boxes, etc.

In an embodiment of the invention, the emotive parser productions will apply and can override the rules of the underlying NLP. This aspect of the invention relaxes the rules of grammar such that communications which have bad grammar, bad syntax, bad spelling or other error triggering events can remain "parseable" by the emotive parser without total dependence on the underlying NLP grammar rules because the emotive tokens can also stand alone to complete a production even if the associated string is Null. Thus an emotive parser's capability of extracting intelligent communication from more types of communications than strict NLPs, because even non grammatically correct or cognitively coherent text, as humans sometimes communicate with, can be parsed, analyzed and presented if emotive content is present.

Multiple Emotive States

We experience emotions in different ways and as well as different times. Furthermore, we can experience several emotions simultaneously or in quick succession. At times, those emotions in quick succession are difficult to catch because of the complexity of the feelings experienced so closely together in time may mask one other others. However, an aspect of the invention allows that more than one emotive state/intensity can be present in association with selected text or alone since the process of experienced emotions may or may not transpire concurrently with message generation. Identifiable groups of emotions closely together can be signature characteristics which albeit add complexity, also add methods to better interpret the intended meaning or intended meaning of the text.

For example a person can be exhausted, grieving, and in pain over some event or occurrence. Those emotive states may all have intensities which one with some introspection can discern. As anything, this comes with practice. An aspect of the invention applies an encoding scheme which can handle multiple emotive state/intensity pairs for the same text by concatenating the emotive tokens with information about the multiple emotive content.

Translation of Emotive Content

Translating emotive content involves several aspects. One aspect of translation, emotive equivalencing, is finding emotive vectors which translate common usage meaning between similar emotive state words by varying the associated emotive intensity range of one emotive state word relative to the other. Another aspect of the invention for translation involves translating communications with emotive content to the author's intended meaning. This latter aspect also involves a solution to ambiguous or uncertain communication issues.

Emotive Equivalence

There are certainly many more words in a language which describe emotive states then is needed in defining an emotive alphabet of individual characters. For example there are at least 8 words in the English language Thesaurus that represent the similar meaning for the emotive state word enraged. The FIGS. 3A and 3B set emotive state set should therefore be expandable to meet demands of a robust language with emotive state synonyms. For this and other reasons a set of primitives of emotive states is difficult to define without additional rules to connect other similar emotive state meanings words.

An aspect of the invention is to accommodate common usage of words representing similar emotive states which are not in a face glyph alphabet set of possible choices. Emotive words defined in a thesaurus or dictionary provide a start in translating emotive vectors between similar emotive state words. The parser tagged feeling words in the text portion of the communication translated to states in the set of emotive primitives in the emotive alphabet set defined in FIGS. 3A-FIG. 3B and vice versa.

Parsed textual emotive states not found in the emotive alphabet set can subsequently trigger the emotive grammar rules to translate and derive intended or substantive meaning as well as found emotive states. Thus, the FIG. 2 emotive state glyph set is clearly a subset of emotive states encountered in communication. A thesaurus or dictionary associating emotive state words with synonymous emotive state words can serve as an emotive state set expander to a much larger working emotive state set. In implementation, the associated intensities of the different emotive state words must scale the intensity of those words to common usage to maintain an equivalent emotive vector, ie. similar emotive state words which differ by emotive intensity value only must be translated by shifting the emotive intensity ranges relative to each other to be reasonably near common usage of those emotive state words.

Figure 6:
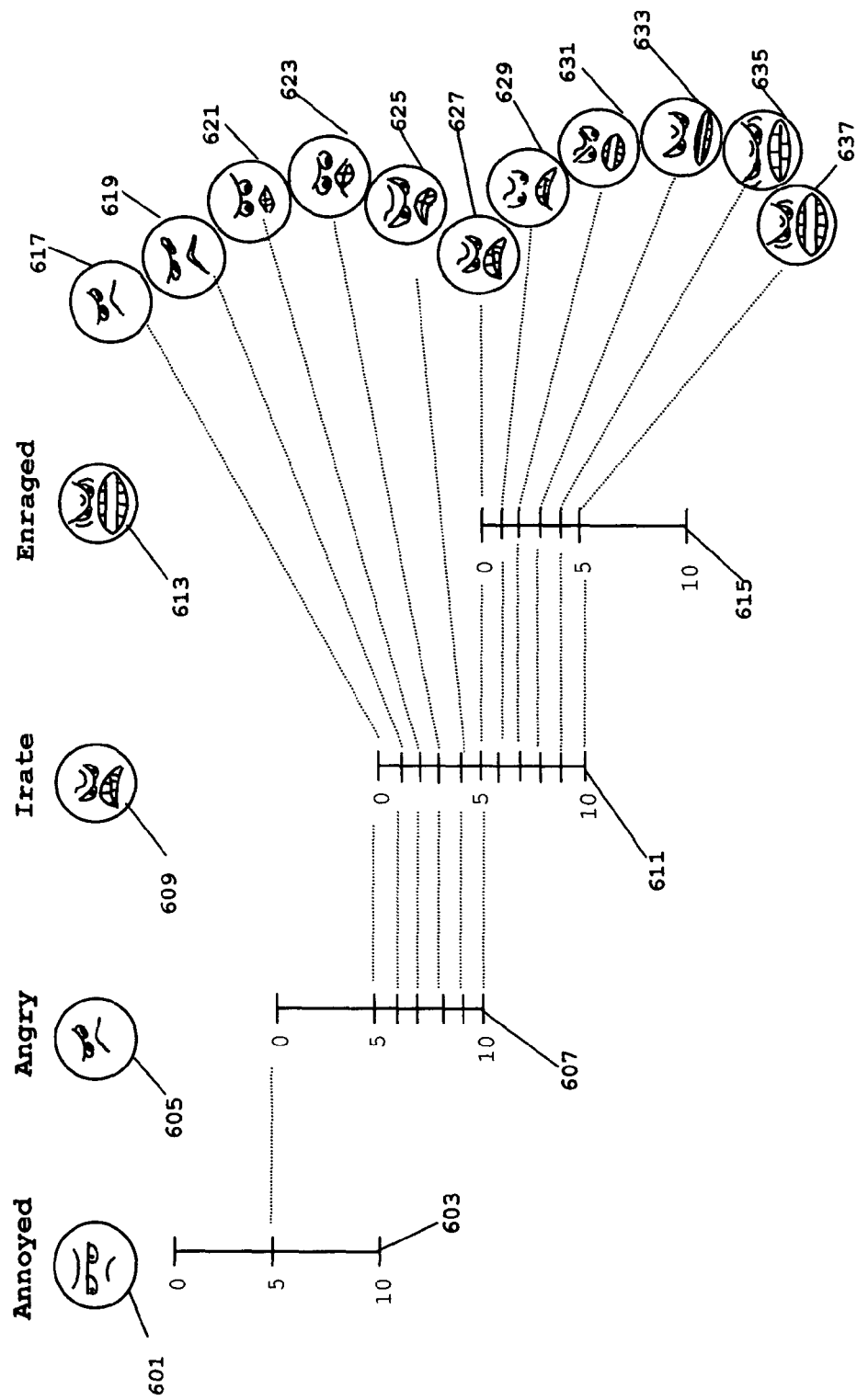
FIG. 6 illustrates the translation of synonym emotive states though emotive state vector equivalencing FIG. 7 contains three illustrations of Anger Emotive Content with identical associated textual communications FIG. 8 illustrations of three identical textual communications with the AROUSED emotive state but with alternate emotive intensities

Emotive vectors represent an emotive state accompanied with a author normalized emotive magnitude or intensity. In one embodiment a numerical value for emotive intensity will range from 1 to 10 with 1 being the lowest intensity felt in a particular emotive state by the author and 10 being the highest emotive state intensity felt by the author. Emotive vector equivalencies can be accomplished to extend the emotive state word number to apply to most feeling words. For example the emotive vector, emotive state/intensity pair, of (IRATE, 10) would be emotively equivalent to the emotive vectors of (ENRAGED, 1) or (TIRED, 10)=(EXHAUSTED, 1) and so forth. The emotive intensity range shift magnitude is determined by common usage of the emotive state word. In other words emotive equivalencing between emotive vectors, emotive state-intensity pairs, translates between words that have similar emotive states but vary by emotive intensity range. A set of emotive intensity range scale translations for similar emotive state words can be defined and stored for use in for the purposes of translations between emotive state-intensity pairs. FIG. 6 graphically illustrates the translation of emotive states though the process of emotive equivalencing. Under the emotive state word ANGRY appearing in a thesaurus, one would find annoyed, irritated, fuming, mad, livid, irate, heated, cross, incensed, enraged, outraged and infuriated. One can translate between those thesaurus defined emotive states by positioning the associated intensity range up or down in range scale to align with common usage of the terms to describe reasonably similar feelings. These feelings are comprised of the name of the emotion and the intensity, hence emotive vectors are being equivalenced in a sense. In the example, we derive an equivalent meaning emotive vector between annoyed and angry, angry and irate, irate and enraged, and hence also between annoyed and enraged by moving the emotive intensity range show this graphically. By translating emotive states through emotive equivalencing, a relatively small face glyph set can be made to represent a much larger vocabulary of emotive state words.

Referring now generally to the Figures and particularly to FIG. 6, FIG. 6 illustrates the translation of synonym emotive states though emotive equivalencing. FIG. 6 depicts four related emotive states; Annoyed 601, Angry 605, Irate 609 and Enraged 613. These emotive states all have emotive intensity ranges shown directly below in 603 607 611 and 615 respectively. Emotive intensities for the emotive state Irate are depicted for the range from zero to ten in face glyphs 617 619 621 623 625 627 629 631 633 635 and 637 respectively. The emotive intensity range scales 603 607 611 615 for the emotive states Annoyed 601, Angry 605 Irate 609 and Enraged 613 respectively, are aligned in vertical parallel positions to illustrate the numerical value equivalence between those similar emotive states. The dotted line from the emotive state Angry 605 emotive intensity range scale 607 at value 5 is shown to be equivalent to the emotive state Irate 609 emotive intensity range 611 at value 0. Hence Angry at intensity of 5 is loosely interchangeable with the emotive vector (Irate, 0) for the purposes of this illustration in emotive equivalence. Similarly, using the emotive intensity range scales in FIG. 6 for the emotive vectors Angry Irate and Enraged, (Angry, 10) 607 is emotively equivalent to (Irate, 5) 611 and which is emotively equivalent to (Enrage, 0) 615. Thus emotive words for states not in the emotive alphabet set can be converted using a thesaurus or dictionary definitions for emotive similar words and a database of stored equivalence range scale relative placement to extend the set of emotive states to include a larger working emotive word vocabulary. The FIG. 6 also illustrates that an emotive state face glyph at midrange emotive intensity of 5 is the state default, something that arbitrary and changeable. Also, the emotive intensity ranges are arbitrarily positioned to align with each other starting at midrange, value 5, also changeable and dependant on the common usage of the emotive state in a particular language and or culture.

Intended Meaning

Words often have more than one meaning and in combinations can have several contextually and grammatically correct meanings. Multiple meanings are sometimes intended as for example a double entendre'. The precise meaning of a communication is dependent on many things including the textual statement, surrounding circumstance, emotive content and relationship between author and receiver. An aspect of the invention provides methods to inference the author intended meaning(s) from the emotive motivation. An emotive intent interpretation is derived from the relationship or association of the author and receiver, the emotive content, the associated text and the circumstance. An emotive parser is used to tokenize the emotive content, while an underlying NLP provides the language subject matter and parts of speech tags for the words in the associated text and in some embodiments, a database of circumstances which maps the subject matter to possible situational associations which can be offered in alternative meanings. The intended meaning or the authors asserted truth is the one that best meets all of the social, cultural protocols, norms, relationship rules and contextual criteria. The best meaning is then available for display on demand by the message receiver. The table 2 below summarizes possible intended meaning with each FIG. 7 and FIG. 8 message.

Referring now generally to the Figures and particularly to FIG. 7, FIG. 7 contains illustration messages 701 705 and 709 of 3 different emotive magnitudes for the emotive state of ANGER but with identical associated textual content "I know where you eat lunch and I know what you eat." In message 701, the author sender assigned emotive state of ANGER with emotive intensity of 3. Message 705 is identical to 701 with the exception that the emotive intensity is set at value 6 and message 709 is identical to 701 and 705 with the intensity value increased to 9. The face glyphs 703 707 and 711 are progressively more angry in facial features and size to better carry the visual affect of increasing anger from intensity of 3 to 9 respectively. The reader will note that the intended meaning of the message changes even though textual content remains the same for each message 701 705 and 709.

A NLP will find "lunch" as the subject noun, "I" and "you" as pronouns, "know" and "eat" as verbs, "where" and "what" as prepositions. These words with their parsed parts of speech tags are all useful to one skilled in the art of constructing grammatical strings from parts of speech, associated emotive words and pre-stored connective string fragments as currently done in grammar checkers an in more recent Turing Test candidate programs.

Circumstantial filters also operate with pre-stored rules. For example, the emotive intent is normalized to the author's feelings but directed at objects in the text, most likely the pronoun 'you'. Since ANGER is characterized as one of the emotions more likely to stir action, as opposed to happy, obstinate, etc., a strong emotional state may indicate more likely action behavior directed outwardly if the objects were not "I" or self indicated. Therefore caution to the object of the directed emotion would be appropriate. The best meaning would then be that author is expressing a threat to pronoun, 'you', that author is knowledgeable regarding 'you's position. The hidden meaning could be an implied threat, which could be highlighted to the receiver.

Emotive Intent Communication may have "hidden" conscious and or subconscious messages. An aspect of the invention seeks to facilitate decoding of the emotive content layer making the response clearly reflect the message intended for the truth of the received communication.

Three scenarios for a received communication containing angry emotive content and three scenarios for the same received communication with the 'aroused' emotive content analyzed and responded to by an aspect of the invention. The intended meaning in each scenario is inferred from the totality of the communication, not only the textual content. In the analysis, the text is analyzed for part of speech and its relationship to the emotive content and likely usage. This is followed by synthesis of a string fragment using the parsed tokens with likely connective string fragments with 'slots' for grammatically likely usage to create emotive intent messages. As emotive intensity level increases, so does the likelihood of an action and/or magnitude of the implied or stated action. The reader will note that the actual textual statement made in all six scenarios is identical and that it is the associated embedded emotive content and relationship between Author/Receiver, which differ.

FIG. 8 illustrates three identical textual communications 801 805 and 809 with the AROUSED emotive state but with varied emotive intensities. The FIG. 8 face glyphs 803 807 and 811 are AROUSED state of intensity 3, 6 and 9 respectively. The reader will note that although the message text is identical and the emotive state is the same, varying the emotive intensity gives each message a different meaning. The associated textual content "I know where you eat lunch and I know what you eat" is identical in 801 805 and 809 as well as in FIG. 7 messages. Again, this serves to illustrate that the emotive content colors the true meaning of the text which is ambiguous without the critical information in the emotive content. The general meaning derives from the emotive state and the more particular message is derived from the emotive intensity of the emotive state.

The communications 701 705 709 801 805 809 are summarized in Table 2 below by their figure number figure identifier FIG. Num., Emotive State (ES), Emotive Intensity (EI) and are show in each row with a possible motivation statement after application of the associated emotive content. The Intended Meaning Construct is a grammatical string constructed with the associated text, emotive intent and pre-stored strings, fragment sentences which are grammatically and generally appropriate for the parts of speech and emotive tokens parsed from the analyzed message and concatenated strings of text by one skilled in the art.

TABLE 2

| FIG num | ES | EI | Motivation or Emotive Intent | Intended Meaning Construct |
|---|---|---|---|---|
| 701 | Anger | 3 | Author is upset with where and what the receiver lunches on. | Bill is mildly angry regarding the matter of lunch, eating with you |
| 705 | Anger | 6 | Author is giving notice that receiver's choice of lunch is not agreeable with Author. | Bill is very angry at the prospects of lunch, eating, with you |
| 709 | Anger | 9 | Threat that Author is knowledgeable regarding receivers vulnerability. | Bill is extremely angry at the prospects of lunch and eating |
| 801 | Aroused | 3 | Author proposing to have lunch with receiver. | Bill is mildly aroused at the thought of seeing YOU at lunch |
| 805 | Aroused | 6 | Author is suggesting a rendezvous with receiver | BILL is very aroused at the thought of seeing YOU at lunch eating |
| 809 | Aroused | 9 | Author is giving warning to receiver, that intensity of arousal indicates action based on knowledge where-when. | BILL is extremely aroused at the thought of seeing YOU at lunch |

The intended meaning can be presented to the viewer in many ways. An embodiment of the invention employs a popup help callout triggered with cursor or display pointing device dwelling on a particular selected region. An example of one such popup callout 813 is shown in FIG. 8 and presents the synthesized intended meaning for a particular communication 809. In similar fashion, a cursor dwell on a face glyph could trigger a popup callout to identify the emotive state and intensity of the face glyph so that guessing or inference from seeing the face glyph, which is quick and helpful, is not the deciding factor in determining precise emotive content transmitted.

Other Embodiments of the Invention

While the invention has been described with reference to a preferred embodiment in which the emotive content is transmitted via formats and protocols in UNICODE, XML, HTML data-streams, the invention may be carried out in a different manner using formats and protocols other than those, such as in SOAP, XLS, SGML, ASCII. In fact, the invention is not confined to any particular format or protocol type by may be carried out using any suitable transmission scheme or model.

Because of the high precision of normalized emotive content, the emotive parsers are especially suited for many other communication applications. For example voting applications may use emotive content as voter choices for the purposes of achieving better mass responses on issues. Ballots could allow choice of emotive state and intensity on issues instead of a Boolean yes-no choice. Voter choice of emotive content would be parsed and tallied for voter emotive state/intensity per issue. Results can be profiled for the minimum individually cumulative pain or maximum social pleasure on a given issue.

Emotive responses and the emotive intensities can cumulatively weight the groups. A "net feeling" on an issue can be calculated by grouping the emotive intensity weighted emotive states representative of pleasurable responses (happy, excited, aroused, etc) against emotive intensity weighted emotive states representative of painful responses (sad, depressed, resentful, etc) in calculating the overall feeling on a particular issue. Those individuals experiencing heightened emotive intensities would be duly weighted higher in vote power than those expressing lower more ambivalent emotive intensity. The rational is that the individuals experiencing more intense feeling from an issue would be more affected and should therefor carry more weight in deciding the issue. That would seem more appropriate where votes are "thrown away" because of only 2 choices, neither of which is preferable. Aspects of the invention facilitate expression and transmission of precise emotive content, which can support an emotive voting application.

Emotive signatures, identifiable patterns of emotions under particular circumstances, or emotive profiling are other applications. The present invention would extend to emotive profiling over time and separate communications. Files and email are date-time stamped. This makes it possible to parse a particular receivers communication, which has transpired over a selectable period of time. Emotive states/intensities and related topics can be summarized to establish any trends in emotive content. A subtle customer relationship may not outwardly display dissatisfaction but verifiable emotive content trend may reveal itself over a period of time. A close friend may be suffering without textually confirming, coloring the text messages received over time. This may manifest itself in some anomalous pattern which when brought to receivers attention, may prompt some additional questions or course of action.

While the invention has been described in detail with reference to preferred embodiments, it is understood that variations and modifications thereof may be made without departing from the true spirit and scope of the invention.

What is claimed is:

1. A system for processing emotive vectors comprising;
   at least one computing device,
   computer memory,
   electronic device data communication,
   at least one application executing on the device coding emotive vectors, and
   the application coding emotive content by preserving emotive vectors with associated text in the electronic communication whereby software instructions stored in memory are under control of the computing device for processing and transmitting emovectors over the electronic communication, each emotive vector comprising an emotive state from a set of feelings and an associated emotive intensity normalized to the author in a given scale with a minimum and maximum intensity, and with associated text embedded in electronic device communications.

2. A system as in claim 1 further comprising the encoding of emotive vectors into standard computing device communication formats.

3. A system as in claim 1 further comprising the encoding of the emotive content into textual communications.

4. A system as in claim 1 further comprising the decoding of emotive content in electronic communications bearing emotive vectors normalized to the communication's author.

5. A system as in claim 4 further comprising parsing the emotive content into tokens for presentation and display of face glyph emotive representations with associated textual content on receiver computing device displays.

6. A system as in claim 5 further comprising the tokenizing of the parts of speech of associated text and with the tokenized emotive content synthesizing author's intended meaning text strings.

7. A system as in claim 4 further comprising the mapping of emotive intensity numerical value from one or more words, from a pre-defined table of numerical values mapped to words.

8. A system as in claim 1 further comprising the scanning and tokenizing of the embedded emotive content in the communications.

9. A system as in claim 1 further comprising parsing communications containing the emotive content using emotive grammar productions to tokenize the emotive content in textual communications.

10. A method of coding emotive vectors, each emotive vector comprising an emotive state from a set of emotive states and an associated emotive intensity normalized to the author to a given scale with a minimum and maximum intensity, with associated text in electronic communications, comprising the steps of:
    reading the emotive vector into a computer memory from an electronic device communication;
    decoding by decoupling the emotive vector from text in the communication;
    processing emotive vector with the device,
    encoding emotive content by preserving emotive vectors with associated text in the electronic communication, and
    transmitting the emotive vector to an electronic device via electronic communication.

11. The method in claim 10 further comprising structuring and synthesizing emotive parsers with productions exploiting emotive vectors encoded in textual datastreams.

12. The method in claim 10 further comprising an emotive parser to tokenize emotive vectors into emotive components and emotive components to a set of face glyphs.

13. The method in claim 12 further comprising an emotive natural language parser to extract and tokenize emotive vector tokens decoupled from the associated natural language text into the parts of speech component tokens.

14. The method in claim 13 further comprising concatenating communication tokenized emotive components with grammatical string fragments and strings selected from the associated text into grammatical strings conveying an intended meaning of the communication.

15. The method in claim 14 further comprising said face glyph set based on graphic rendering of reasonably representative emotive states and associated emotive intensities.

16. A computer program residing on a computer-readable media, said computer program communicating emotive content comprising emotive vectors, each emotive vector comprising an emotive state and an associated emotive intensity in a given scale with a minimum and maximum intensity normalized to the author with associated text embedded in electronic device communications, comprising the steps of:
    reading and translating the emotive vector from the emotive content into a computer memory from an electronic device medium;
    decoding and encoding emotive content by preserving emotive vectors with associated text in the electronic communication and
    processing emotive vector with at least one electronic device, and
    transmitting the emotive vector to another electronic device.

17. A computer network comprising:
    a plurality of computing devices connected by a network;
    said computing devices which display graphical and textual output;
    applications executing on the devices embedding emotive vectors which are representations of emotive states with associated author normalized emotive intensity;
    assembling emotive content by associating emotive vectors with associated text in electronic communication;
    encoding emotive content by preserving association of emotive vectors with associated text in the electronic communication;
    transmitting the communication with emotive content to one or more receiver computing devices;
    parsing communication bearing emotive content; and
    mapping emotive vectors to face glyph representations from a set of face glyphs;
    Such that communications encoded with emotive content facilitate exchange of precise emotive intelligence.

18. A computer program residing on a computer-readable media, said computer program communicating over a computer network comprising:
    a plurality of computing devices connected by a network;
    said computing devices which display graphical and textual output;
    computer-readable means for applications executing on the devices embedding emotive vectors which are representations of emotive states with associated author normalized emotive intensity;
    computer-readable means for assembling emotive content by associating emotive vectors with associated text in electronic communication;
    computer-readable means for encoding emotive content by preserving association of emotive vectors with associated text in the electronic communication;
    computer-readable means for transmitting the communication with emotive content to one or more receiver computing devices;
    computer-readable means for parsing communication bearing emotive content; and
    computer-readable means for mapping emotive vectors to face glyph representations from a set of face glyphs; and
    computer-readable means for displaying communication of textual with associated face glyph emotive representations on said computing device displays;
    whereby communications encoded with emotive content provide means of exchange of precise emotive intelligence.

* * * * *